Figure 7:
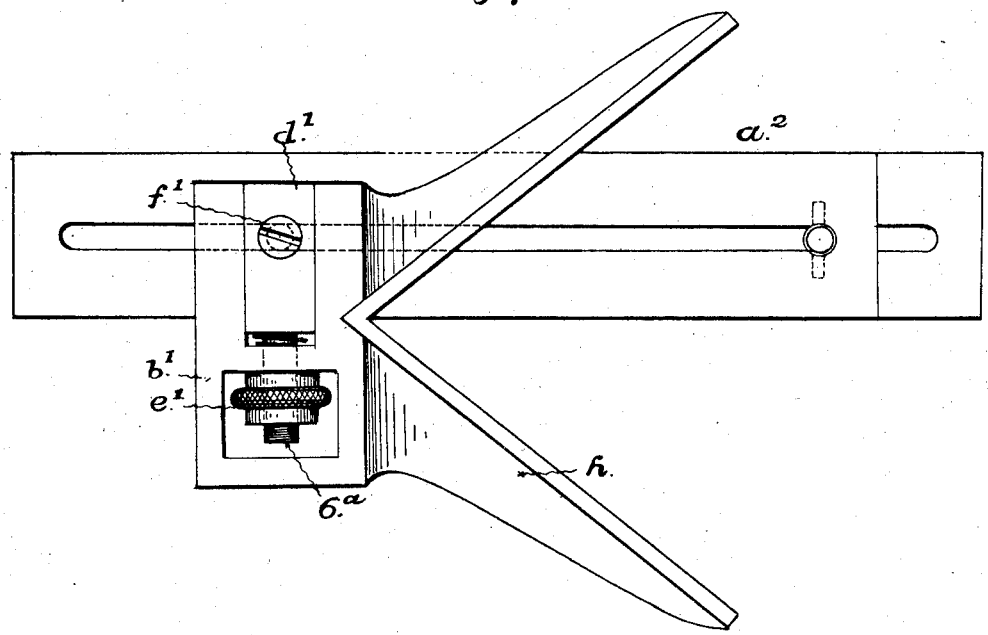

No. 738,422. PATENTED SEPT. 8, 1903.
A. DUFFY.
MACHINIST'S TRY-SQUARE.
APPLICATION FILED JULY 14, 1902.
NO MODEL.
2 SHEETS—SHEET 1.
Fig. 1.
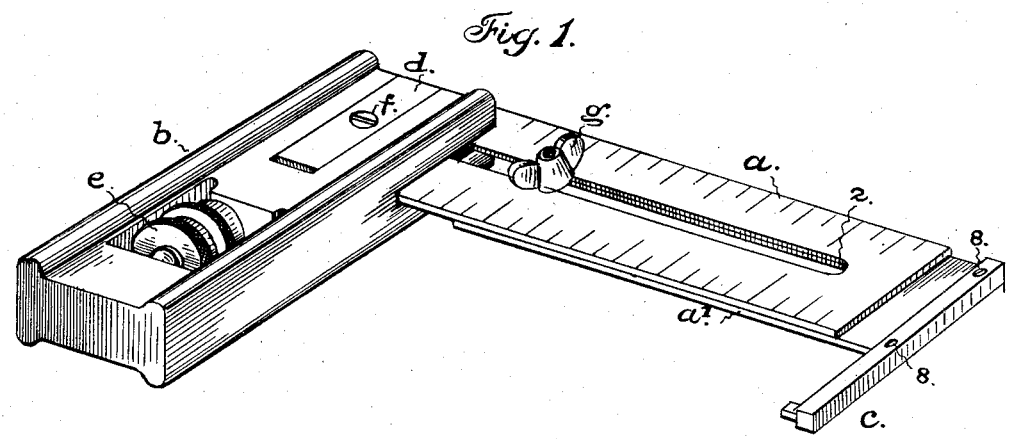
Fig. 2.
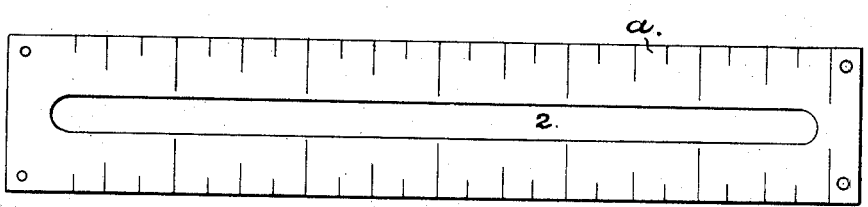
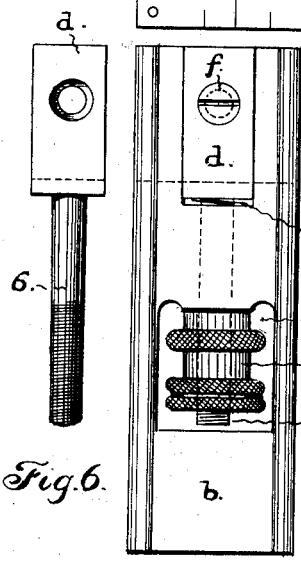
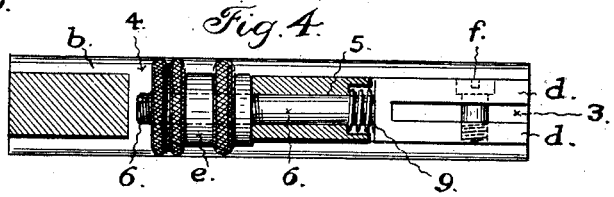
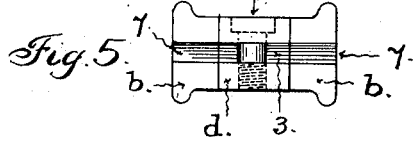
Witnesses:
M. Regner
George P. Brand
Inventor:
Anthony Duffy
By C. C. Osborn
his Atty.

No. 738,422. PATENTED SEPT. 8, 1903.
A. DUFFY.
MACHINIST'S TRY-SQUARE.
APPLICATION FILED JULY 14, 1902.
NO MODEL. 2 SHEETS—SHEET 2.

No. 738,422.

Patented September 8, 1903.

UNITED STATES PATENT OFFICE.

ANTHONY DUFFY, OF SAN FRANCISCO, CALIFORNIA.

MACHINIST'S TRY-SQUARE.

SPECIFICATION forming part of Letters Patent No. 738,422, dated September 8, 1903.

Application filed July 14, 1902. Serial No. 115,598. (No model.)

*To all whom it may concern:*

Be it known that I, ANTHONY DUFFY, a citizen of the United States, and a resident of the city and county of San Francisco and State of California, have invented a new and useful Improvement in Machinists' Try-Squares, of which the following is a specification.

This invention has for its object the production of an improved try-square for machinists formed of separable parts or members capable of being disconnected and brought into small compass and containing when assembled and joined together a try-square, a rule, calipers, center-square, and straight-edge.

To such end and object chiefly my said invention comprises certain novel construction and combination of blade, stock, and fastening devices, as hereinafter fully described, and pointed out in the claims at the end of this specification.

The accompanying drawings herein referred to represent an improved implement embodying my said invention, Figure 1 being a perspective view of the same having the several functions of a rule, a try-square, calipers, and straight-edge. Fig. 2 is a detail plan of the blade. Fig. 3 is a plan of the stock separated from the blade. Fig. 4 is a longitudinal sectional view of the stock; Fig. 5, an end view of the stock, taken from the right side of Fig. 4. Fig. 6 is a detail top view of the adjustable block that forms part of the fastening means by which the blade is held in the stock. Fig. 7 is a top view of the stock and angle-piece that is provided for use when the implement is used as a center-square.

The blade $a$ has a long slot 2 longitudinally through the center and nearly the entire length of the blade, sufficient metal being left for strength between the end of the blade and the end of the slot. When the instrument has two short blades instead of a single long blade, as shown in Fig. 1, both blades $a$ $a'$ are slotted for a clamp-screw $g'$, provided with a thumb-nut $g$. This gives an extension-blade that can be lengthened or shortened as the work requires, and the lower or movable blade $a'$ is provided with a leg $c$ on the outer end extending at right angles beyond the side of the blade, as shown in Fig. 1, so as to form a caliper-leg at that end of the tool. The end of the blade $a'$, being let into a slit in the leg $c$, is secured by screws 8 8. This extension-blade $a'$ is readily detached by removing the fastening-screw $g'$, leaving the main blade free for use with the stock $b$. The last-named part being thicker and heavier than the blade, as is usual in try-squares of this character, is slotted transversely in and through one end to admit the blade. This slot 7 is equal in width to the thickness of the blade, and in depth it is equal, or nearly so, to the width of the blade, the latter part being fitted squarely to it, so as to stand exactly at right angles to the stock. The means provided for securing the blade and the stock together holds them rigidly at right angles when in use and also allows the parts to be readily separated when the tool is taken apart to be carried in the tool-box. This fastening is a permanent part of the stock, to which it is attached in condition ready for operating by hand. It consists of a slide-block $d$, fitted in a longitudinal slot in the end of the stock and also slotted transversely, as shown at 3, Fig. 4. The block $d$ has a limited movement longitudinally, but no play or movement sidewise in the stock, and the blade $a$, fitting tightly in the transverse slot 3 of the block, is secured in the block by a screw $f$ passing through the block from the top side to the bottom and through the slot 2 in the blade. A screw-threaded rod 6, rigidly secured to the inner end of the slide-block, extends through an aperture 5, bored through the solid portion of the stock from the bottom of the slot in a longitudinal direction toward the opposite end, and is fitted with a nut $e$, having a milled head for turning it with the fingers. An opening 4 in the stock gives space for the nut to work in, and the threaded end of the rod 6 extends through the solid metal of the stock into that opening. When screwed on the rod, the flat face of the nut comes to a bearing against the end of the opening 4 and draws the slide-block backward or inward in the slot, and as the blade is confined in the block $d$ by the screw $f$ the effect of such movement is to draw the edge of the blade $a$ closely and squarely to a seat against the bottom of the slot 7 7 in the end of the stock. A light coiled spring 9, interposed between the end of the slide-block and the back of the longitudinal slot, holds the nut against the back of the opening 4 and keeps the nut and rod from working loose. The block and the stock are firmly locked and fixed at right angles to each other by this means, and by a simple turn of the nut the stock can be shifted readily on the blade from the end to the middle of the blade, thus forming in one position a try-square and in the other a T-square. The blade and the stock are separated to bring the parts into small compass for carrying in the pocket or stowing away by loosening the screw $f$ and drawing it out of the slot in the blade. A supplemental or additional stock $b'$, carrying angle-pieces $h\ h$ and having the same means for securing and adjusting it to the blade, is substituted for the other stock $b$ when the instrument is used as a center-square. The angle-pieces $h$, being permanently fixed to or formed integrally with the stock, extend from one side thereof, and when the blade is fixed in position the edge next to that side of the stock on which the angle-pieces are situated will bisect the angle included between the adjacent vertical sides of the pieces $h\ h$ the same as in the ordinary center-square, wherein the angle-piece forming the head is permanently fixed to the blade. In the supplemental stock $b'$ the slide-block $d'$, rod $6^a$, and nut $e'$ are constructed and operate the same as the fastenings on the stock $b$ of the try-square. All these parts or members are easily assembled and secured together to produce one or the other of the before-mentioned implements, and where a single blade is preferred for use under certain conditions the extension-blade is quickly removed, leaving the implement in the handiest form for use as a try-square, a T-square, or a center-square by proper adjustments of the stock on the blade.

Having thus fully described my invention, what I claim as new therein, and desire to secure by Letters Patent, is—

1. The herein-described try-square comprising a slotted blade, a stock having a slot in one end extending longitudinally of the stock and through the same from side to side, a second slot corresponding in width to the thickness of the blade and extending transversely across the end of the stock through the middle thereof, a slide-block in the longitudinal slot of the stock and movable therein, said slide-block having a slot in the middle extending transversely of that part, and adapted to admit the blade, a screw securing the blade to the slide-block, and on which the blade is fitted to slide for adjusting it in the block, a screw-threaded rod on the end of the slide-block having a bearing in the stock, and a nut on the rod operating on the slide-block to draw the blade up to a solid bearing against the bottom of the transverse slot in the stock on both sides of the said block.

2. In a machinist's try-square the combination, of a blade having a slot extending longitudinally of it, a stock having a slot in the end extending longitudinally of the stock and a socket extending from the end thereof into the body of the stock, a slide-block filling said slot widthwise, but of less dimension longitudinally, a screw-threaded rod on the stock secured at one end to the slide-block and having a nut on the opposite end, the stock and the slide-block being slotted transversely to admit the slotted blade, and a screw passing through the slotted blade and the slide-block and securing the former rigidly in the latter piece.

In testimony whereof I have signed my name in the presence of two subscribing witnesses.

ANTHONY DUFFY.

Witnesses:
J. H. BROWNING,
A. W. HANSEN.